(12) United States Patent
Saitoh

(10) Patent No.: US 6,360,089 B1
(45) Date of Patent: *Mar. 19, 2002

(54) RADIO APPARATUS WITH DIVERSITY ANTENNAS

(75) Inventor: Tetsuya Saitoh, Saitama (JP)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/506,464

(22) Filed: Feb. 17, 2000

Related U.S. Application Data

(63) Continuation of application No. 08/842,205, filed on Apr. 23, 1997, now Pat. No. 6,055,422.

(30) Foreign Application Priority Data

Apr. 23, 1996 (JP) .............................................. 8-101168

(51) Int. Cl.[7] .................................................. H04B 1/06
(52) U.S. Cl. .............................. 455/277.1; 455/277.1; 455/133; 455/135; 455/132; 455/131; 455/272; 455/343; 455/574; 455/38.3
(58) Field of Search .................................. 455/132, 133, 455/131, 135, 272, 343, 574, 277.2, 38.3

(56) References Cited

U.S. PATENT DOCUMENTS

| | | |
|---|---|---|
| 4,035,728 A | 7/1977 | Ishikawa et al. ............ 325/304 |
| 4,823,398 A | 4/1989 | Hashimoto .................. 455/134 |
| 5,390,357 A | 2/1995 | Nobusawa et al. ......... 455/134 |
| 5,566,364 A | 10/1996 | Mizoguchi et al. ......... 455/134 |

FOREIGN PATENT DOCUMENTS

| | | |
|---|---|---|
| EP | 0 529 623 A2 | 3/1993 |
| EP | 0 665 658 A2 | 8/1995 |
| EP | 0 680 161 A1 | 11/1995 |
| JP | 5-252094 | 9/1993 |
| JP | 7-50628 | 2/1995 |
| JP | 7-202774 | 8/1995 |
| JP | 8-8797 | 1/1996 |

*Primary Examiner*—Daniel Hunter
*Assistant Examiner*—Khawar Iqbal
(74) *Attorney, Agent, or Firm*—Scully, Scott Murphy & Presser

(57) ABSTRACT

A radio apparatus includes a plurality of receiving systems connected to multiple antennas providing diversity, respectively, each receiving system including an antenna terminator and a preamplifier. After one receiving system is discriminated from another receiving system based on radio signals received by the receiving systems, respectively, a controller controls the one receiving system such that an antenna terminator is inactive and a preamplifier is active and, at the same time, further controls the other receiving system such that an antenna terminator is active and a preamplifier is inactive.

17 Claims, 4 Drawing Sheets

RADIO APPARATUS WITH DIVERSITY ANTENNAS

CROSS-REFERENCE TO RELATED APPLICATION

This patent application is a continuation patent application of parent patent application Ser. No. 08/842,205 filed Apr. 23, 1997, U.S. Pat. No. 6,055,422.

BACKGROUND OF THE INVENTION

1. Field of the Invention

The present invention generally relates to a radio apparatus having multiple separate antennas, and in particular to a radio apparatus suitable for a portable transceiver or a portable receiver.

2. Description of the Related Art

In a radio apparatus having a pair of separate antennas providing spatial diversity, especially in a portable radio apparatus, it is difficult to ensure a sufficient spacing between the separate antennas, respectively. This causes isolation between antenna devices to be reduced, resulting in deterioration of antenna gain.

To overcome such a problem, a radio apparatus capable of selectively terminating the diversity antennas has been proposed in Japanese Patent Unexamined publication No. 7-202774. This conventional radio apparatus is provided with an antenna terminating system including a monopole antenna and a small size antenna which are connected to first and second antenna terminators through first and second switch devices, respectively. When the received signal level of the monopole antenna is higher than that of the small size antenna, the monopole antenna is connected to a receiver by the first switch device and the small size antenna is connected to the second antenna terminator by the second switch device. Otherwise, the monopole antenna is connected to the first antenna terminator by the first switch device and the small size antenna is connected to the receiver by the second switch device.

SUMMARY OF THE INVENTION

In the conventional radio apparatus mentioned above, a radio-frequency (RF) amplifier is not provided at the stage preceding the receiver. Thereforet a radio signal received by the receiver is reduced in signal level by feeder lines and the switch device, resulting in deterioration of the accuracy of received level detection. Further, the first and second switch devices must use a single-pole double-throw switch for selecting one of the paths to the receiver and the antenna terminator, resulting in difficulty in meeting the needs of both effective isolation and miniaturization.

An object of the present invention is to provide a radio apparatus which is capable of receiving radio signals through multiple antennas while meeting the needs of both miniaturization and improved isolation between multiple antennas.

Another object of the present invention is to provide a radio apparatus which is capable of ensuring the improved isolation and a sufficient level of received radio signal received through multiple antennas.

According to the present invention, each of a plurality of receiving systems is provided with an antenna terminator and a path control switch. The antenna terminator selectively terminates a corresponding antenna of the multiple antennas and the path control switch selectively switches on and off to provide a path for a radio signal received by the corresponding antenna. The antenna terminator and the path control switch are controlled such that an antenna terminator is inactive and a path control switch is on in a selected receiving system and, contrarily, an antenna terminator is active and a path control switch is off in the other receiving system.

Since an antenna terminator is inactive and a path control switch is on in a selected receiving system and an antenna terminator is active and a path control switch is off in the other receiving system, the isolation between multiple antennas is improved, promoting miniaturization.

The path control switch may be a preamplifier which is selectively on and off. When the preamplifier is on, the path is provided. When the preamplifier is off, the path is blocked off. More specifically, each receiving system includes an antenna terminator and a preamplifier. The preamplifier amplifies a radio signal received by the corresponding antenna, the preamplifier being selectively active and inactive. Further, the radio apparatus is comprised of a discriminator for discriminating one receiving system from another receiving system based on radio signals received by the receiving systems, respectively, and a controller for controlling the one receiving system such that an antenna terminator is inactive and a preamplifier is active to produce an amplified radio signal to be used as a received signal and controlling the other receiving system such that an antenna terminator is active and a preamplifier is inactive.

DETAILED DESCRIPTION OF THE PREFERRED EMBODIMENTS

Figure 1:
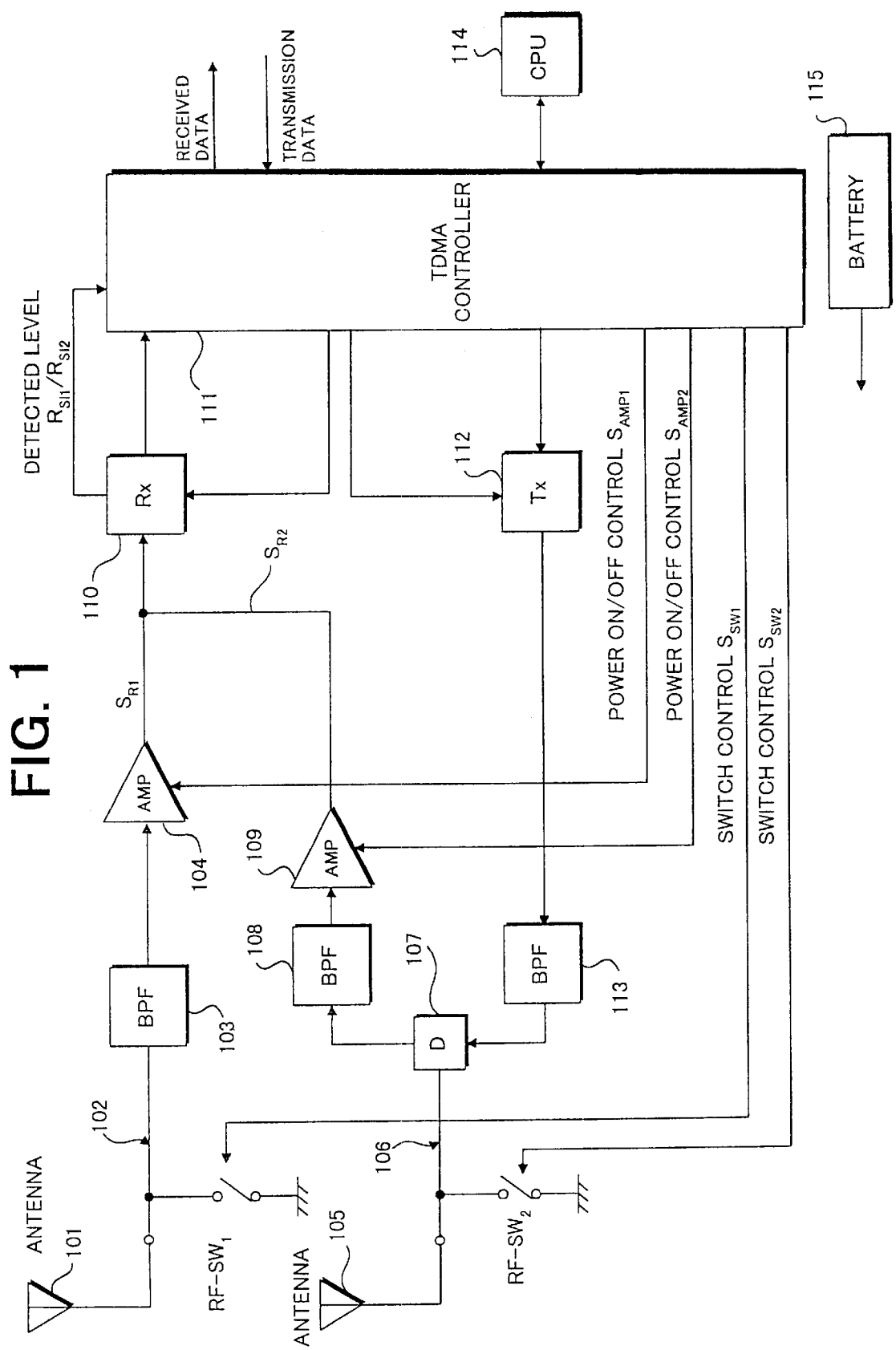
FIG. 1 is a block diagram showing an radio apparatus according to an embodiment of the present invention.

Referring to FIG. 1, a radio apparatus according to a first embodiment of the present invention is comprised of a first receiving system and a second receiving system. The first receiving system includes a first antenna 101 connected to a first antenna matching line 102 through which the first antenna 101 is connected to a band-pass filter 103. A radio-frequency switch RF-SW$_1$ connects a predetermined position of the first antenna matching line 102 to ground depending on a switch control signal S$_{SW1}$. The RF switch RF-SW$_1$ is a single-pole-single-throw switch which may be a semiconductor switch such as a diode switch or a small-size relay switch. The band-pass filter 103 is further connected to an RF preamplifier 104 which is selectively active and inactive, in other words, powered on and off, according to a power control signal S$_{AMP1}$. When powered on, the RF preamplifier 104 amplifies a first received radio signal passing through the band-pass filter 103 to produce a first amplified radio signal S$_{R1}$.

The second receiving system includes a second antenna 105 connected to a second antenna matching line 106 through which the second antenna 105 is connected to a duplexer 107. A radio-frequency switch RF-SW$_2$ connects a predetermined position of the second antenna matching line 106 to ground depending on a switch control signal S$_{SW2}$. The RF switch RF-SW$_2$ is a single-pole single-throw switch which may be a semiconductor switch such as a diode switch or a small-size relay switch. The duplexer 107 is connected to a band-pass filter 108 for reception. The band-pass filter 108 is further connected to an RF preamplifier 109 which is selectively active and inactive, in other words, powered on and off, according to a power control signal S$_{AMP2}$. When powered on, the RF preamplifier 109 amplifies a second received radio signal passing through the band-pass filter 108 to produce a second amplified radio signal S$_{R2}$.

The respective output signals S$_{R1}$ and S$_{R2}$ of the RF preamplifiers 104 and 109 are input to a radio receiver 110. As will be described later, the output signals S$_{R1}$ and S$_{R2}$ are alternately input to the radio receiver 110 during level detection periods and, during receiving periods, only a selected output signal S$_{R1}$ or S$_{R2}$ is input to the radio receiver 110. The radio receiver 110 includes a frequency converter, a demodulator, a signal level detector and other necessary circuits (not shown) and outputs a detected signal level R$_{SI}$ and a demodulated baseband signal to a controller 111 such as TDMA synchronization controller. The controller 111 controls the RF switches RF-SW$_1$ and RF-SW$_2$ using the switch control signals S$_{SW1}$ and S$_{SW2}$, respectively, and the RF preamplifiers 104 and 109 using the power on/off control signals S$_{AMP1}$ and S$_{AMP2}$, respectively.

A radio transmitter 112 includes a modulator, a frequency converter and other necessary circuits (not shown) and is connected to the duplexer 107 through a band-pass filter 113. Therefore, the second antenna 105 can be used for both reception and transmission through the duplexer 107. The component circuits of the radio apparatus are controlled by a processor 114. Further, a battery 115 including a power controller may be used as a power supply of the apparatus.

Figure 2A:
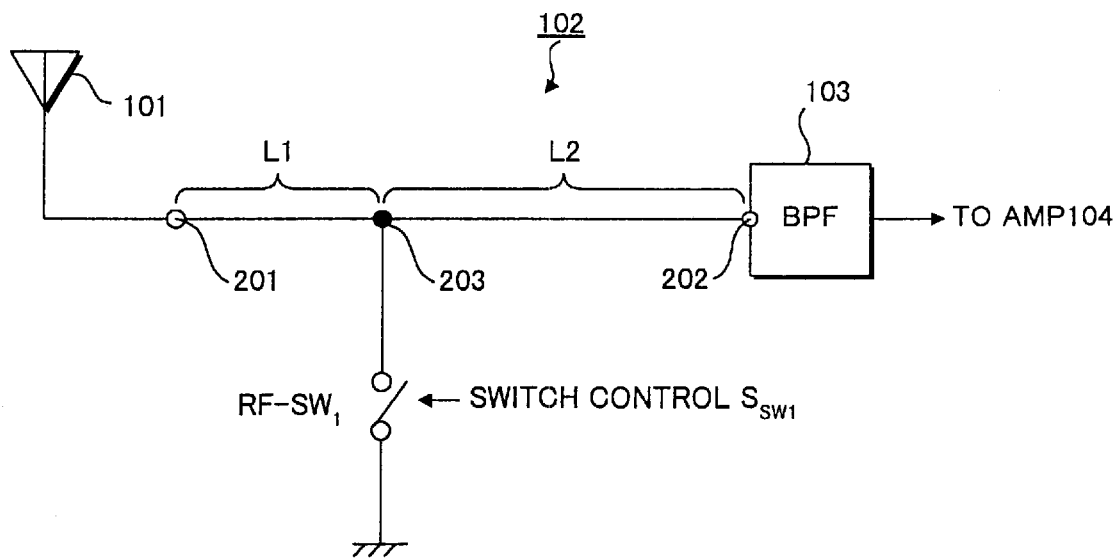
FIG. 2A is a diagram showing a matching line of a first receiving circuit as shown in FIG. 1.

Referring to FIG. 2A, the first antenna matching line 102 is connected to the first antenna 101 at a feeding point 201 and is further connected to the band-pass filter 103 at its input terminal 202. Further, the predetermined position 203 of the first antenna matching line 102 is connected to one terminal of the RF switch RF-SW$_1$ which is grounded at the other terminal. In this embodiment, a first line length from the feeding point 201 to the predetermined position 203 and a second line length from the predetermined position 203 to the input terminal 202 of the band-pass filter 103 are set to L1 and L2, respectively.

When the RF switch RF-SW$_1$ is off or open, the feeding point 201 is connected to the input terminal 202 of the band-pass filter 103 through a total length L1+L2 of the first antenna matching line 102. The total line length L1+L2, the impedance and the configuration of the first antenna matching line 102 are designed to maximize the antenna gain of the first antenna 101 when the RF switch RF-SW$_1$ is off.

On the other hand, when the RF switch RF-SW$_1$ is on or closed, the predetermined position 203 of the first antenna matching line 102 is connected to ground through the RF switch RF-SW$_1$. The first length L1 and the second length L2 are designed to minimize the antenna gain of the first antenna 101 when the RF switch RF-SW$_1$ is on. Needless to say, the length and configuration of the first antenna matching line 102 vary according to the type, length and other parameters of the first antenna 101.

Figure 2B:
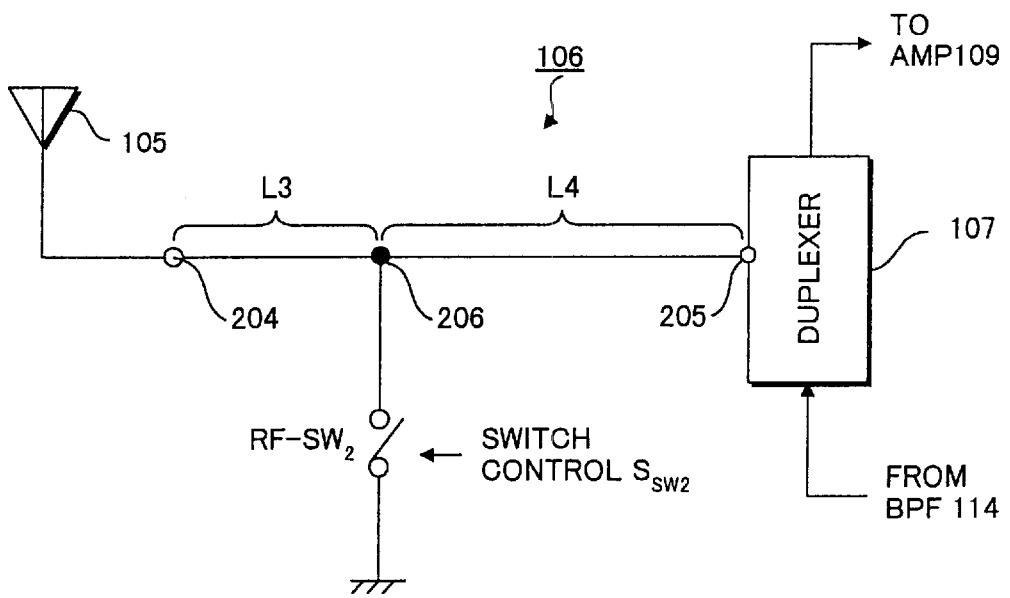
FIG. 2B is a diagram showing a matching line of a second receiving circuit as shown in FIG. 1.

Similarly, the second antenna matching line 106 is formed as described above. Referring to FIG. 2B, the second antenna matching line 106 is connected to the second antenna 105 at a feeding point 204 and is further connected to the duplexer 107 at its input terminal 205. Further, the predetermined position 206 of the second antenna matching line 106 is connected to one terminal of the RF switch RF-SW$_2$ which is grounded at the other terminal. In this embodiment, a third line length from the feeding point 204 to the predetermined position 206 and a fourth line length from the predetermined position 206 to the input terminal 205 of the duplexer 107 are set to L3 and L4, respectively.

When the RF switch RF-SW$_2$ is off or open, the feeding point 204 is connected to the input terminal 205 of the duplexer 107 through a total length L3+L4 of the second antenna matching line 106. The total line length L3+L4, the impedance and the configuration of the second antenna matching line 106 are designed to maximize the antenna gain of the second antenna 105 when the RF switch RF-SW$_2$ is off.

On the other hand, when the RF switch RF-SW$_2$ is on or closed, the predetermined position 206 of the second antenna matching line 106 is connected to ground through the RF switch RF-SW$_2$. The third length L3 and the fourth length L4 are designed to minimize the antenna gain of the second antenna 105 when the RF switch RF-SW$_2$ is on. Needless to say, the length and configuration of the second antenna matching line 106 vary according to the type, length and other parameters of the second antenna 105.

A level detection of a received radio signal, switching operations of the RF switches RF-SW$_1$ and RF-SW$_2$ and power control of the RF preamplifiers 104 and 109 will be described in detail hereinafter, assuming that the radio apparatus is a mobile terminal which can be used in a mobile communication system of Time-Division Multiple Access scheme (TDMA). In the TDMA system, a base station transmits a radio signal such as a control signal or a communication signal to a lot of mobile terminals located in its service area through a control channel or a communication channel including a plurality of predetermined assigned time slots.

Figure 3:
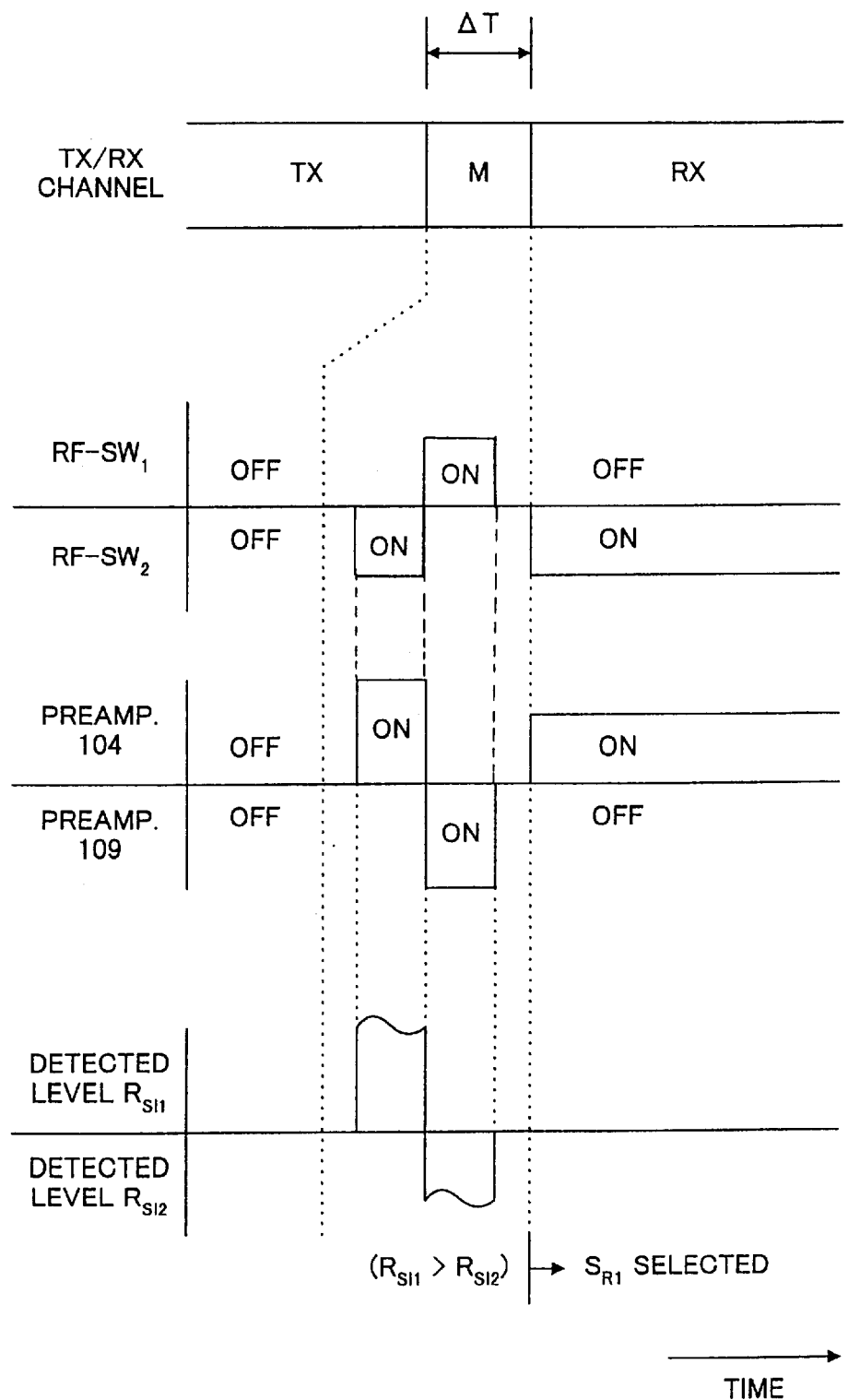
FIG. 3 is a time chart showing ON/OFF operations of radio-frequency switches and preamplifiers according to the embodiment.

Referring to FIG. 3, during a time period ΔT of a slot M between a transmission (TX) channel and a reception (RX) channel, the processor 114 instructs the controller 111 to sequentially output the switch control signals S$_{SW2}$ and S$_{SW1}$ to the RF switches RF-SW$_2$ and RF-SW$_1$, respectively, and to sequentially output the power on/off control signals S$_{AMP1}$ and S$_{AMP2}$ to the RF preamplifiers 104 and 109, respectively. In other words, the RF switches RF-SW$_1$ and RF-SW$_2$ alternatively become on (active) and off (inactive) so that one is on when the other is off. The RF preamplifiers 104 and 109 alternately become on (active) and off (inactive) so that one is on when the other is off. More specifically, when both the RF switches RF-SW$_2$ and the RF preamplifier 104 are on, a received radio signal from the first antenna 101 is amplified by the RF amplifier 104 and the amplified radio signal S$_{R1}$ is output to the radio receiver 110. The radio receiver 110 outputs a detected signal level R$_{ST1}$ of the received radio signal S$_{R1}$ to the controller 111.

On the other hand, when both the RF switches RF-SW$_1$ and the RF preamplifier 109 are on, a received radio signal from the second antenna 105 is amplified by the RF preamplifier 109 and the amplified radio signal S$_{R2}$ is output to the radio receiver 110. The radio receiver 110 outputs a detected signal level R$_{SI2}$ of the received radio signal S$_{R2}$ to the controller 111. When receiving the detected signal levels R$_{ST1}$ and R$_{ST2}$, the controller 111 compares them and, based on the detected signal levels during the level detection period, selects an antenna of better receiving condition, that is, a receiving system of a higher detected signal level.

It is assumed that $R_{ST1}$ is greater than $R_{ST2}$ during the level detection period, that is, a received signal of the first antenna 101 provides a better receiving condition than that of the second antenna 105. In this case, when a reception channel has come, the controller 111 outputs the respective switch control signals $S_{SW1}$ and $S_{SW2}$ to the RF switches RF-SW$_1$ and RF-SW$_2$ so that the RF switch RF-SW$_1$ is turned off and the RF switch RF-SW$_2$ is turned on. At the same time, the controller 111 outputs the respective power on/off control signals $S_{AMP1}$ and $S_{AMP2}$ to the RF preamplifiers 104 and 109 so that the RF preamplifier 104 becomes on and the RF preamplifier 109 becomes off. Therefore, during the reception channel, with maximizing the antenna gain of the first antenna 101 and minimizing that of second antenna 105, the only the received radio signal $S_{R1}$ of the RF preamplifier 104 is selected and received by the radio receiver 110. Since the antenna gain of the second antenna 105 is minimized and the RF preamplifier 109 is inactive, the coupling of the second antenna system with the first antenna system is dramatically reduced.

In cases where $R_{ST1}$ is smaller than $R_{ST2}$ during a level detection period, that is, a received signal of the second antenna 105 provides a better receiving condition than that of the first antenna 101, in a reception channel, the controller 111 outputs the respective switch control signals $S_{SW1}$ and $S_{SW2}$ to the RF switches RF-SW$_1$ and RF-SW$_2$ so that the RF switch RF-SW$_1$ is turned on and the RF switch RF-SW$_2$ is turned off. At the same time, the controller 111 outputs the respective power on/off control signals $S_{AMP1}$ and $S_{AMP2}$ to the RF preamplifiers 104 and 109 so that the RF preamplifier 104 becomes off and the RF preamplifier 109 becomes on. Therefore, during the reception channel, with maximizing the antenna gain of the second antenna 105 and minimizing that of the first antenna 101, only the received radio signal $S_{R2}$ of the RF preamplifier 109 is selected and received by the radio receiver 110. Since the antenna gain of the first antenna 101 is minimized and the RF preamplifier 101 is inactive, the coupling of the first antenna system with the second antenna system is dramatically reduced.

Figure 4:
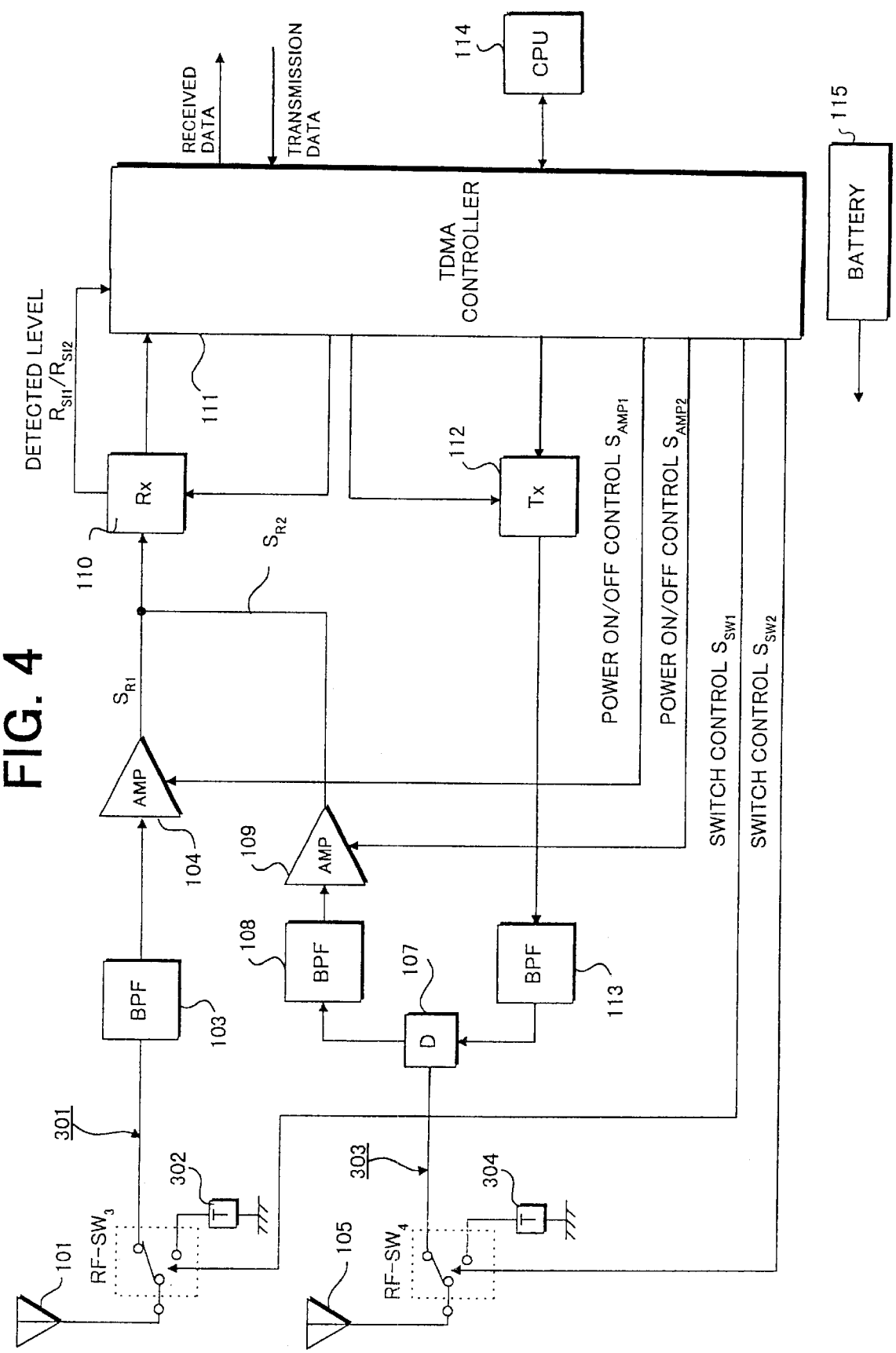
FIG. 4 is a block diagram showing an radio apparatus according to another embodiment of the present invention.

FIG. 4 shows a radio apparatus according to a second embodiment of the present invention, where circuit blocks similar to those previously described with reference to FIG. 1 are denoted by the same reference numerals. Further, since operations of these circuit blocks are similar to those previously described with reference to FIG. 1, their descriptions are omitted.

Referring to FIG. 4, the radio apparatus is comprised of a first receiving system and a second receiving system. The first receiving system includes a first antenna 101 connected to a first antenna matching line 301 through which the first antenna 101 is connected to the band-pass filter 103. The first antenna matching line 301 includes an RF switch RF-SW$_3$ at a predetermined position thereof. The predetermined position is determined in the same way as described in FIG. 2.

The RF switch RF-SW$_3$ is a single-pole double-throw switch which may be a semiconductor switch such as a diode switch or a small-size relay switch. The common terminal of the RF switch RF-SW$_3$ is connected to the first antenna 101 through a part of the first antenna matching line 301, the first terminal of the RF switch RF-SW$_3$ is connected to the band-pass filter 103 through the other part of the first antenna matching line 301, and the second terminal of the RF switch RF-SW$_3$ is connected to ground through an antenna terminator 302. The RF switch RF-SW$_3$ connects the first antenna 101 to a selected one of the band-pass filter 103 and the antenna terminator 302 depending on the switch control signal $S_{SW1}$.

When the RF switch RF-SW$_3$ is in first-terminal position, The total line length, the impedance and the configuration of the first antenna matching line 301 are designed to maximize the antenna gain of the first antenna 101. on the other hand, when the RF switch RF-SW$_3$ is in second-terminal position, the second terminal of the RF switch RF-SW$_3$ is connected to ground through the antenna terminator 302. Therefore, the impedance of the antenna terminator 302 are designed to minimize the antenna gain of the first antenna 101 when the RF switch RF-SW$_1$ is in second-terminal position. Needless to say, the length and configuration of the first antenna matching line 301 and the impedance of the antenna terminator 302 vary according to the type, length and other parameters of the first antenna 101.

It is the same with the second antenna matching line 303 including an RF switch RF-SW$_4$ and a second antenna terminator 304. Therefore, its detailed description is omitted.

In such a configuration, the signal level detection is also performed as described in FIG. 3. When the received signal level of the first antenna 101 is higher than that of the second antenna 105, the first antenna 101 is connected to the band-pass filter 103 by the RF switch RF-SW$_3$ switching to the first terminal. At the same time, the second antenna 105 is connected to the second antenna terminator 304 by the RF switch RF-SW$_4$ switching to the second terminal and the RF preamplifier 109 is powered off. Since the antenna gain of the second antenna 105 is minimized and the RF preamplifier 109 is inactive, the coupling of the second antenna system with the first antenna system is dramatically reduced.

When the received signal level of the first antenna 101 is smaller than that of the second antenna 105, the first antenna 101 is connected to the first antenna terminator 302 by the RF switch RF-SW$_3$ switching to the second terminal and, at the same time, the second antenna is connected to the duplexer 107 by the RF switch RF-SW$_4$ switching to the first terminal. Since the antenna gain of the first antenna 101 is minimized and the RF preamplifier 101 is inactive, the coupling of the first antenna system with the second antenna system is dramatically reduced.

It is apparent that the present invention can be applied to another radio apparatus including three or more receiving systems. In this case, the RF preamplifiers of the receiving systems may be powered on one-by-one in a predetermined period to produce the received radio signals which are used to detect signal levels.

What is claimed is:

1. A radio apparatus comprising:
    a plurality of receiving systems each connected to a corresponding antenna, each receiving system comprising:
        a radio-frequency switch for connecting a corresponding antenna to ground when the radio-frequency switch is in one of an open or closed position and for maximizing an antenna gain of the corresponding antenna when in the other of the open or closed positions;
        a path control switch for selectively switching on and off to provide a path for a radio signal received by the corresponding antenna;
        a discriminator for discriminating one receiving system from other receiving systems based on radio signals received by the receiving systems, respectively; and
        a controller for simultaneously coordinating the control of the plurality of receiving systems such that a first radio-frequency switch of the one receiving system is open and a corresponding first path control switch is on and a second radio-frequency switch of each of the other receiving systems is closed and corresponding second path control switches are off.

2. The radio apparatus according to claim 1, wherein each path control switch comprises a preamplifier for amplifying the radio signal received by the corresponding antenna, each preamplifier being selectively active and inactive, wherein the controller controls the one receiving system such that the first radio-frequency switch is open and a first preamplifier is active to produce an amplified radio signal to be used as a received signal and controls the other receiving system such that the second radio-frequency switch is closed and a second preamplifier is inactive.

3. The radio apparatus according to claim 1, wherein each of the radio-frequency switches is a single-pole single-throw switch, and wherein the radio apparatus further comprises an antenna terminator having an antenna matching line connected to the corresponding antenna, the antenna matching line being connected to one terminal of the radio-frequency switch at a predetermined position thereof, each radio-frequency switch being grounded at the other terminal thereof, the antenna matching line maximizing an antenna gain of the corresponding antenna when the radio-frequency switch is open, and the predetermined position of the antenna matching line being set to minimize the antenna gain of the corresponding antenna when the radio-frequency switch is closed.

4. The radio apparatus according to claim 1, wherein each radio-frequency switch is a single-pole double-throw switch, and wherein the radio apparatus further comprises an antenna terminator having:
an antenna matching line connected to the corresponding antenna, each radio-frequency switch dividing the antenna matching line into an antenna-side line and a preamplifier-side line at a predetermined position of the antenna matching line, a common terminal of the radio-frequency switch being connected to the antenna-side line, a first terminal of the radio-frequency switch being connected to the preamplifier-side line, the antenna matching line maximizing an antenna gain of the corresponding antenna when the radio-frequency switch switches on the first terminal thereof; and
an antenna terminating device connected to a second terminal of the radio-frequency switch at one end thereof and grounded at the other end thereof, the antenna terminating device and the predetermined position of the antenna matching line being set to minimize the antenna gain of the corresponding antenna when the radio-frequency switch switches on the second terminal thereof.

5. The radio apparatus according to claim 2, wherein the preamplifier is selectively powered on and off under control of the controller such that the preamplifier is active when powered on and inactive when powered off.

6. The radio apparatus according to claim 5, wherein the controller further controls the receiving systems such that a receiving system is selected one by one from the receiving systems and a radio-frequency switch and a preamplifier of the selected receiving system become open and active, respectively, to produce amplified radio signals which are used to discriminate the one receiving system by the discriminator.

7. The radio apparatus according to claim 2, wherein each receiving system further comprises a band-pass filter followed by the preamplifier, for filtering signal components other than signal components of a predetermined frequency band to supply it to the preamplifier.

8. A radio receiver comprising:
first and second antennas providing spatial diversity;
a first receiving system comprising:
a first radio-frequency switch for connecting the first antenna to ground when the first radio-frequency switch is in one of an open or closed position and for maximizing an antenna gain of the first antenna when in the other of the open or closed positions; and
a first preamplifier for amplifying a radio signal received by the first antenna, the first preamplifier being selectively active and inactive;
a second receiving system comprising:
a second radio-frequency switch for connecting the second antenna to ground when the second radio-frequency switch is in one of an open or closed position and for maximizing an antenna gain of the second antenna when in the other of the open or closed positions; and
a second preamplifier for amplifying a radio signal received by the second antenna, the second preamplifier being selectively active and inactive;
a level detector for detecting first and second signal levels from first and second radio signals received by the first and second receiving systems, respectively;
a comparator for comparing the first and second signal levels to determine one receiving system which provides a higher signal level; and
a controller for simultaneously coordinating the control of the first and second receiving systems such that the first radio-frequency switch of the first receiving system maximizes an antenna gain of the first antenna and the first preamplifier is active and the second radio-frequency switch of the second receiving system connects the second antenna to ground and the second preamplifier is inactive thereby producing an amplified radio signal from the first receiving system to be used as a received signal.

9. The radio receiver according to claim 8, wherein each of the first and second radio-frequency switches are a single-pole single-throw switch, wherein the radio receiver further comprises:
a first antenna terminator comprising a first antenna matching line connected to the first antenna, the first antenna matching line being connected to one terminal of the first radio-frequency switch at a predetermined position thereof, the first radio-frequency switch being grounded at the other terminal thereof, the first antenna matching line maximizing an antenna gain of the first antenna when the first radio-frequency switch is open, and the predetermined position of the first antenna matching line being set to minimize the antenna gain of the first antenna when the first radio-frequency switch is closed, and
a second antenna terminator comprising a second antenna matching line connected to the second antenna, the second antenna matching line being connected to one terminal of the second radio-frequency switch at a predetermined position thereof, the second radio-frequency switch being grounded at the other terminal thereof, the second antenna matching line maximizing an antenna gain of the second antenna when the second radio-frequency switch is open, and the predetermined position of the second antenna matching line being set to minimize the antenna gain of the second antenna when the second radio-frequency switch is closed.

10. The radio receiver according to claim 8, wherein each of the first and second radio-frequency switches are a single-pole double-throw switch, and wherein the radio receiver further comprises first and second antenna terminators, the first antenna terminator comprising:

a first antenna matching line connected to the first antenna, the first radio-frequency switch dividing the first antenna matching line into an antenna-side line and a preamplifier-side line at a predetermined position of the first antenna matching line, a common terminal of the first radio-frequency switch being connected to the antenna-side line, a first terminal of the first radio-frequency switch being connected to the preamplifier-side line, the first antenna matching line maximizing an antenna gain of the first antenna when the first radio-frequency switch switches on the first terminal thereof; and a first antenna terminating device connected to a second terminal of the first radio-frequency switch at one end thereof and grounded at the other end thereof, the first antenna terminating device and the predetermined position of the first antenna matching line being set to minimize the antenna gain of the first antenna when the first radio-frequency switch switches on the second terminal thereof, and the second antenna terminator comprising:

a second antenna matching line connected to the second antenna, the second radio-frequency switch dividing the second antenna matching line into an antenna-side line and a preamplifier-side line at a predetermined position of the second antenna matching line, a common terminal of the second radio-frequency switch being connected to the antenna-side line, a first terminal of the second radio-frequency switch being connected to the preamplifier-side line, the second antenna matching line maximizing an antenna gain of the second antenna when the second radio-frequency switch switches on the first terminal thereof; and a second antenna terminating device connected to a second terminal of the second radio-frequency switch at one end thereof and grounded at the other end thereof, the second antenna terminating device and the predetermined position of the second antenna matching line being set to minimize the antenna gain of the second antenna when the second radio-frequency switch switches on the second terminal thereof.

11. The radio receiver according to claim 10, wherein each of the first and second preamplifiers is selectively powered on and off under control of the controller such that the preamplifier is active when powered on and inactive when powered off.

12. The radio receiver according to claim 11, wherein the controller further controls the first and second receiving systems such that the first and second preamplifiers are alternately active with the first and second antenna terminators alternately active in a phase opposite to the first and second preamplifiers to produce the first and second radio signals which are used to detect the first and second signal by the level detector.

13. The radio receiver according to claim 8, wherein the first receiving system further comprises a first band-pass filter followed by the first preamplifier, for filtering signal components other than signal components of a predetermined frequency band to supply it to the first preamplifier, and the second receiving system further comprises a second band-pass filter followed by the second preamplifier, for filtering signal components other than signal components of a predetermined frequency band to supply it to the second amplifier.

14. In a radio apparatus comprising a plurality of receiving systems connected to multiple antennas providing diversity, respectively, each receiving system comprising:

a radio-frequency switch for connecting a corresponding antenna of the multiple antennas to ground when the radio-frequency switch is in one of an open or closed position and for maximizing an antenna gain of the corresponding antenna when in the other of the open or closed positions; and a path control switch for selectively switching on and off to provide a path for a radio signal received by the corresponding antenna, a control method for the radio apparatus, comprising the steps of:

a) discriminating one receiving system from other receiving systems based on radio signals received by the receiving systems, respectively; and b) simultaneously coordinating the control of the plurality of receiving systems such that a first radio-frequency switch of the one receiving system maximizes the gain of a corresponding antenna and a corresponding first path control switch is on and a second radio-frequency switch of each of the other receiving systems is connected to ground and corresponding second path control switches are off.

15. The control method according to claim 14, wherein the path control switch comprises a preamplifier for amplifying the radio signal received by the corresponding antenna, the preamplifier being selectively active and inactive, wherein, in step b), the one receiving system is controlled such that the first radio-frequency switch is open and a first preamplifier is active to produce an amplified radio signal to be used as a received signal, and in step c), the other receiving system is controlled such that the second radio-frequency switch is closed and a second preamplifier is inactive.

16. The control method according claim 14, wherein the preamplifier is selectively powered on and off such that the preamplifier is active when powered on and inactive when powered off.

17. The control method according to claim 14, wherein step a) comprises the steps of:

controlling the receiving systems such that a receiving system is selected one by one from the receiving systems and a radio-frequency switch and a preamplifier of only the selected receiving system become open and active, respectively, to produce amplified radio signals corresponding to the receiving systems;

comparing signal levels which are detected from the amplified radio signals, respectively;

discriminating the one receiving system providing a higher signal level.

* * * * *